United States Patent [19]
Billington

[11] 3,768,503
[45] Oct. 30, 1973

[54] REGULATOR ATMOSPHERIC PRESSURE PROTECTOR

[75] Inventor: Evans R. Billington, Glenview, Ill.

[73] Assignee: Golconda Corporation, Chicago, Ill.

[22] Filed: Oct. 24, 1972

[21] Appl. No.: 300,219

[52] U.S. Cl................ 137/377, 137/354, 150/52 R
[51] Int. Cl............................................ F16k 27/12
[58] Field of Search.................. 137/296, 377, 378, 137/381, 382, 382.5, 351, 354; 150/52 R

[56] References Cited
UNITED STATES PATENTS

| 2,691,988 | 10/1954 | Weatherhead...................... 137/377 |
| 1,652,051 | 12/1927 | Rogers............................ 137/505.41 |
| 2,179,886 | 11/1939 | Gerow et al.................... 137/382 X |
| 2,421,700 | 6/1947 | Johnson............................... 137/377 |
| 2,653,793 | 9/1953 | St. Clair........................... 137/382 X |
| 2,685,300 | 8/1954 | Hammon............................ 137/382 |
| 2,762,386 | 9/1956 | Fogle.................................. 137/296 |

Primary Examiner—Alan Cohan
Assistant Examiner—Gerald A. Michalsky
Attorney—Harbaugh and Thomas

[57] ABSTRACT

A snap-on, year around, flexible protector marginally enclosing and providing a circular chamber of air around the joint between the body and bonnet of a liquefied petroleum gas pressure regulator that prevents freezing rain, sleet, or highway splash from closing an atmospheric vent opening to the bonnet that is located in the joint.

7 Claims, 5 Drawing Figures

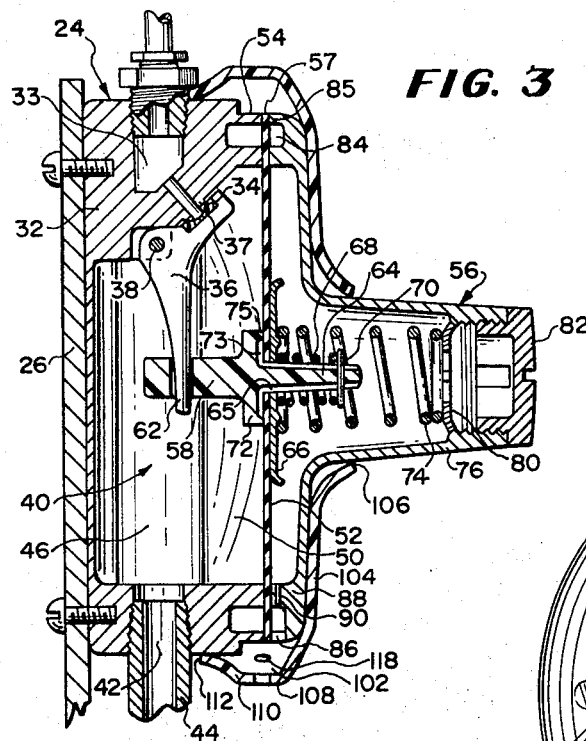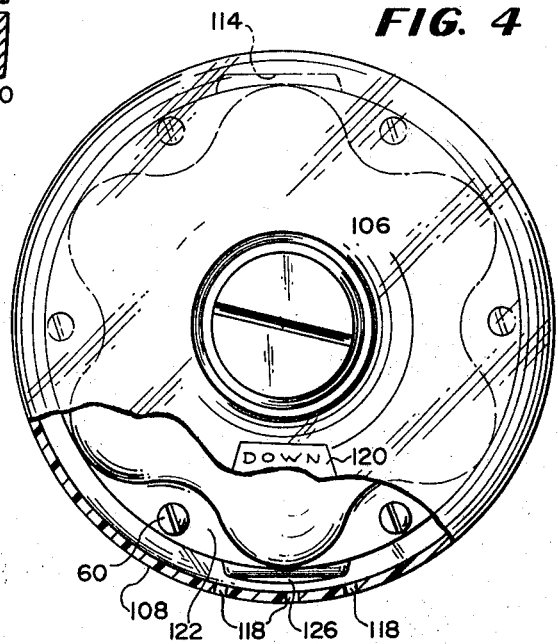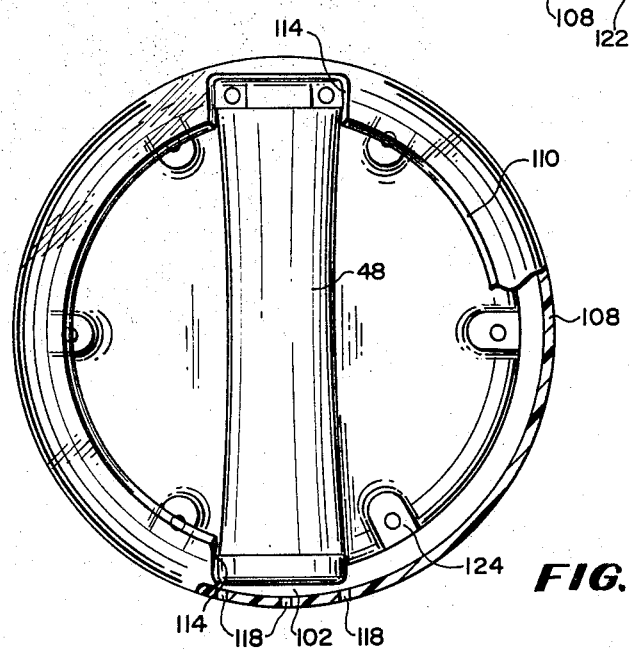

REGULATOR ATMOSPHERIC PRESSURE PROTECTOR

BACKGROUND OF INVENTION

Portable domestic liquefied petroleum gas fuel systems used for trailers and the like are generally single stage pressure reduction systems with the regulator and tanks exposed to the weather as located either on a bracket or shelf at the rear, or, generally at the front of a trailer on the tow bar where they are further exposed to road splash from the rear wheels of a towing vehicle.

Through a short pigtail of quarter inch copper tubing the regulator receives vaporized propane gas from a 20 lbs. container in which the liquedized gas boils during eduction under a vapor pressure of approximately 50 p.s.i. gage, at 32°F. The eduction pressure is lowered through a small valve orifice to a service pressure of 11 inches of water column, (0.397 p.s.i. gage) for use in burners. This service pressure is controlled by a diaphragm exposed to the service pressure downstream of the valve on one side and on its other side subjected to atmosphere and a spring for opening the valve. The spring controls the differential pressure at which the valve is opened and closed while the atmosphere, effective through a bonnet vent opening, provides the reference pressure existing at the burners.

The bonnet vent opening may be quite small to keep out insects. It is generally sized to permit breathing of the bonnet chamber relative to diaphragm movement and located adjacent to the service outlet boss of the regulator to open downwardly when the regulator is oriented in the service line leading to appliance burners. This avoids debris and liquids falling and collecting directly on the vent that may obstruct it.

Under operating conditions, the service pressure is quite constant since the vent keeps the pressure in the bonnet at atmospheric pressure. Accordingly, it is important that the vent be open directly to atmosphere at all times.

These considerations are concerned with the relationship of gage pressures in the domestic system. However, in these considerations, absolute pressures are fundamentally and significantly involved.

The vapor pressure of the liquid in the tank must be well above atmospheric pressure throughout an expected environmental temperature range so that gas in its vapor phase will have a supply pressure absolute above atmospheric pressure at all times for operation of the system. The relationship in absolute pressures is approximately 65 p.s.i. vapor pressure for propane at 32°F. and atmospheric pressure at 14.7 p.s.i. The service pressure then constitutes the 14.7 p.s.i. plus the service pressure of 0.397 p.s.i. provided by the regulator spring thereby making the service pressure 15.097 p.s.i. absolute.

Thus it is seen that this increment of pressure of 0.397 p.s.i. gage is a very small increment of the absolute pressures involved in the system. It is less than 2.7 percent of the service pressure, absolute, and, is quite critical. 0.541 p.s.i. gage service pressure is considered to be dangerous and this amounts to a 3.6 percent or an increase of 0.9 percent absolute.

The service pressure varies at any given time due to inertias of working parts, friction between the mechanical parts, and gas flow with pulsing demand. In operation there occurs an almost imperceptible escape of gas from the service line to the bonnet through a safety valve carried by the diaphragm and such is harmlessly vented to atmosphere through the bonnet vent.

On the other hand, if the regulator is not kept externally clean and the bonnet vent to atmosphere becomes obstructed, all considerations then become related to absolute pressures. The pressure differential across the diaphragm safety relief valve can then change materially. For instance, the pressure in the bonnet can vary as the trapped air contracts and expands with changing temperatures and diaphragm movement. The likelihood of fuel gas entering the bonnet chamber is increased, and any fuel gas passing the safety valve and reaching bonnet air will add to the air pressure already there according to the law of partial pressures. The resulting increased pressure in the bonnet is added to the 0.4 p.s.i. of the spring force. The combined efforts then cause the regulator valve to open and close at a higher regulated pressure and in turn increases the service pressure. If the vapor reaching the bonnet is fog due to the propane boiling and a depletion of latent heat of vaporization it can later expand in the bonnet and further increase therein the cumulate effective bonnet pressure. And, step by step, little by little the dispensing pressure in the service line is increased essentially because the bonnet is not vented to the atmosphere.

As mentioned, a service pressure of 15 inches $H_2O$ (0.541 p.s.i.) gage is considered to be dangerous for burners set to handle 11 inches $H_2O$ (0.397 p.s.i.). This is only a rise of 4.0 inches $H_2O$ (0.144 p.s.i.). This rise results with an addition of 1 percent of gas in the bonnet volume. A 2 percent addition would provide 15.8 p.s.i. absolute and the spring adds another 0.4 p.s.i. effort. The flame may blow away from the burner in its requirement for enough air for combustion. It requires 24 cu. ft. of air to burn 1 cu. ft. of propane gas, preferably at a mixture ration of 4.7 percent of gas, with an upper limit of 9.5 percent for inflammability.

SUMMARY OF INVENTION

In the present invention not only is the vent opening protected against obstruction, but the major portion of the surface of the bonnet exposed to weather is covered by a novel, thick, low heat conductive, flexible, plastic covering that also covers exposed metal body parts contacting the edge of the bonnet to minimize heat exchange between the bonnet and rain or sleet regardless of which is the coldest, namely, a cold bonnet that freezes rain, or a warm bonnet chilled by sleet, the bonnet temperature also changing rapidly under gas dispensing conditions.

In protecting the bonnet vent located at the gasket assembly joint between the valve body and bonnet, the novel covering is a snap-on vinyl cover oriented with respect to the service outlet boss of the regulator and provides an enlarged circular compartment around the joint of the bonnet to maintain the vent open to atmosphere at all times, whether it be disposed upwardly or downwardly on a trailer. The cover front is centrally open and seals with a gripping pressure around the regulator spring boss thereby exposing the bonnet cap for the ready servicing and adjusting of the regulator spring.

Marginally the cover presses in contact with the valve bonnet and body at distances spaced from their gasket joint to assure capillary control of the flow of any ambient water well away from the bonnet vent if ice is atmospherically forming anywhere. For that reason there is no run down along the gasket edge between the valve body and bonnet where the vent is located. Any liquid penetrating this contact area is conducted by direct flow to the circular compartment and drains therefrom without contacting the vent.

The cover can be used with regulators of a particular rated size but having slightly different measurements as manufactured by various suppliers.

The outlet boss of the regulator disclosed extends radially beyond the vent hole with the contact between the cover and the boss being below the vent hole level. Drainage away from the vent is thereby assured of any water passing between the cover edges and the inlet and outlet bosses. If the vent is disposed upwardly in the regulator installation, the edges of the recess in the cover around the outlet boss conducts drainage down along the boss away from the vent hole. Two or three horizontally spaced small drain holes are located through the wall defining the lowest point of the circular compartment and these are well below any droplet contact with the valve body. The drain holes are spaced to thwart tow car splash. Accordingly, the bonnet vent is kept open to atmosphere at all times.

In the drawings:

FIG. 3 is a vertical sectional view of the assembled regulator and cover;

FIG. 4 is a front elevational view of the regulator with the cover partially cut away at the bottom to show ito relative orientation; and FIG. 5 is a rear elevational view of the regulator with the cover partially cut away at the bottom.

THE PREFERRED EMBODIMENT

Figure 1:
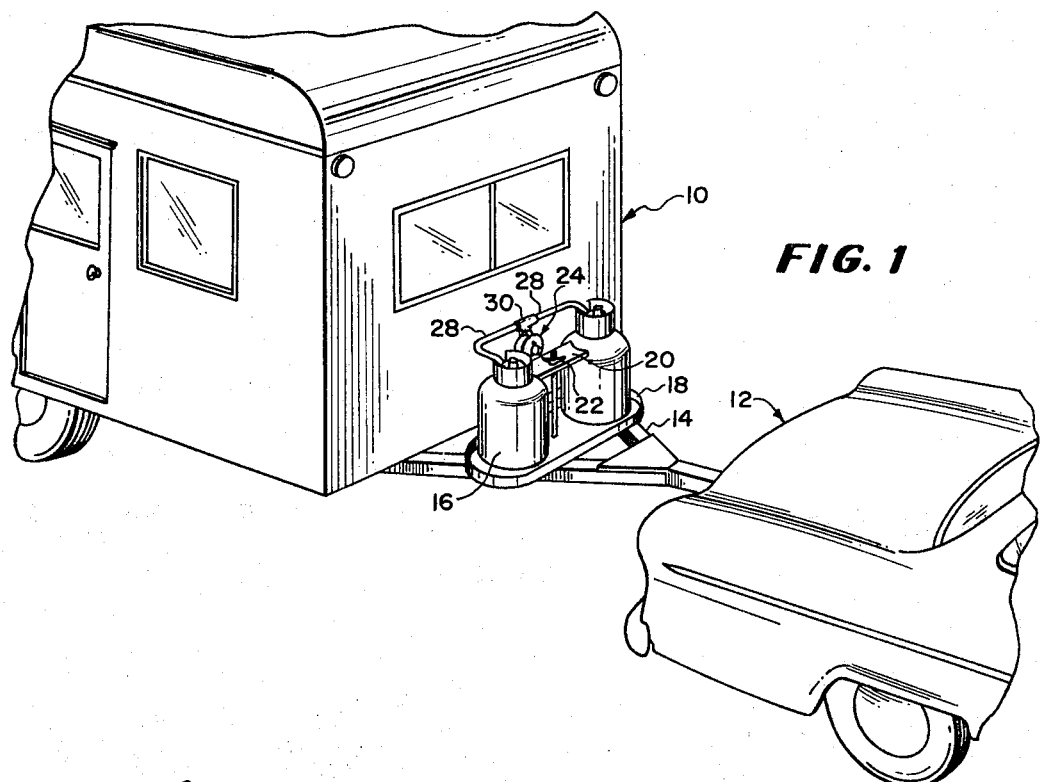
FIG. 1 is a perspective view of a hitched car and trailer with a conventional domestic dual container, vapor eduction, propane fuel gas system having a single stage reduction of pressure that provides a service pressure of 11 inches H₂O gage.
Figure 2:
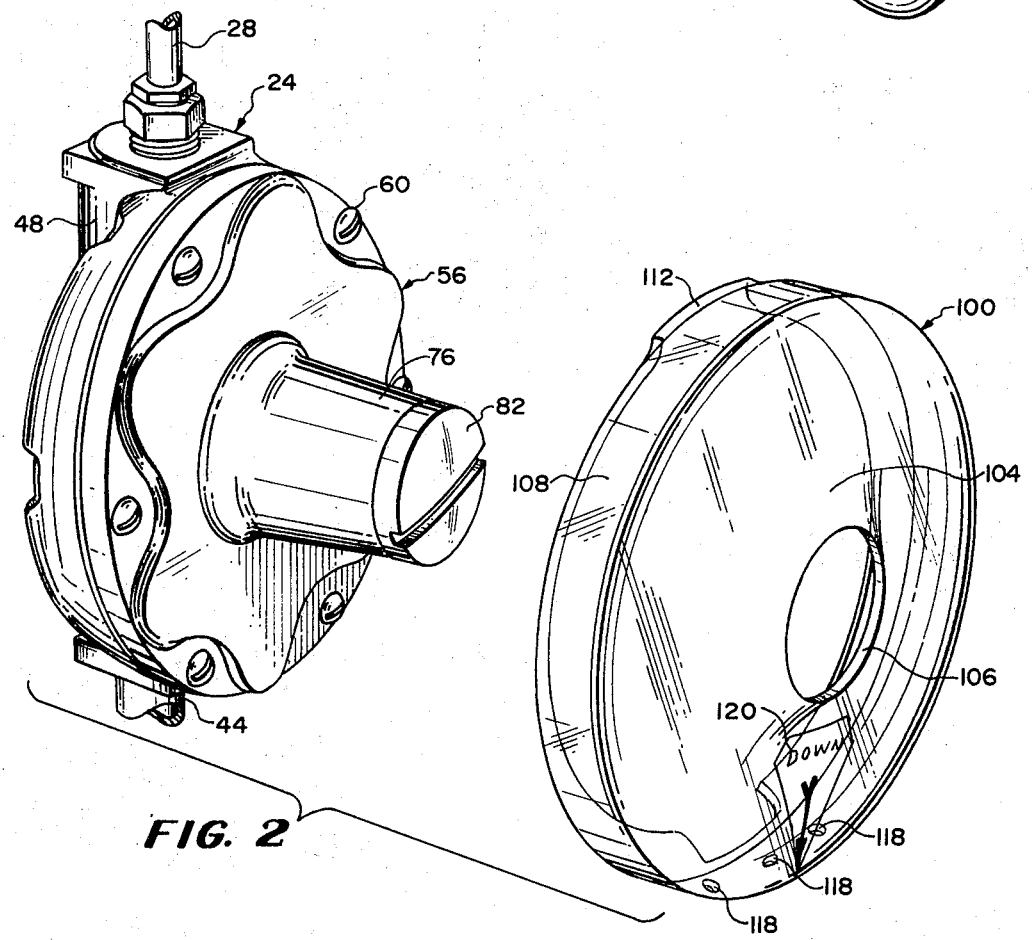
FIG. 2 is an exploded or preassembly perspective view of the juxtapositioned regulator and cover embodying the invention that is shown assembled in FIG. 1.

In FIG. 1 a trailer 10 and automobile 12 are shown conventionally connected for towing by a tow bar 14 upon which is mounted two 20 lbs. liquefied gas containers 16 as secured to a platform assembly 18 by a yoke 20 and winged nut 22. Such are generally referred to as bottles because of the smallness of their size. A single stage regulator 24 is secured to an upright 26 FIG. 3 on the platform 18 and its inlet is either connected by a short pigtail 28 directly to the outlet of a container as shown in FIG. 3 as in a one bottle system, or, to a throw-over control 30 that is connected to the containers by short pigtails 28 as shown in FIG. 1 in a two bottle system. The pigtails are in communication with the top of the containers through shut off valves to educt vaporized propane. In a two bottle system eduction is generally controlled by the throw-over to come from only one container at a time with the other acting as a standby reserve.

The construction of the regulator is essentially conventional and representative. It has a body 32 with an inlet 33, valve inlet port 34 at the top closed by a valve seat 37, carried by a lever 36 pivoted at 38. The service pressure cavity 40 into which the valve opens has at its bottom an outlet 42 connected to a service line 44. The cavity 40 comprises a trough portion 46 in a vertically disposed body enlargement 48 on the back of the body and comparatively shallow areas 50 on both sides thereof.

A diaphragm 52 closes the cavity 40 to seal the low pressure chamber as marginally clamped in sealed relationship to the rim 54 thereof by the bonnet 56 to provide a sealed joint 57 as held in place by bolts 60. A yoke 58 carried by the diaphragm connects with the arm 62 of the valve lever 36 to open and close the valve 34 as moved by the diaphragm.

A service pressure control spring 74 is provided in the bonnet boss 76 and abuts at one end against the plate 66 with its compression adjusted at the other end by a sheet metal screw 80 to induce the valve opening movement of the lever at a predetermined differential across the diaphragm of approximately 0.397 p.s.i., gage. Preferably the outer end of the boss 76 is closed by a plug 82 to discourage tampering yet permit access to an authorized serviceman.

The yoke 58 has a flange 72 recessed at 73 on its upper face within a marginal safety valve land 75 and a post 64 fluted at 65 extending loosely through the diaphragm and receives a plate 66 thereon along with a compression spring 68. The spring is held on the post 64 under compression by a cross pin 70 to urge the plate against the diaphragm. The diaphragm is thereby urged against the yoke flange valve land 75 to provide a safety relief valve which operates to relieve unusual pressures in the service chamber to the bonnet side of the diaphragm. The yoke 58 as held by the lever 36, when the valve is closed, permits the diaphragm and plate to move away from the flange and valve land 75 to permit a flow of gas along the flutes 65 of the post 64 and thereby relieves a high pressure in the service compartment when the yoke is limited in its movement by the valve being closed.

Although the diaphragm can alone marginally serve as a sealing gasket, a metal ring can be used on the bonnet side to assist the sealing, if desired. The rim of the bonnet engaging the marginal edge diaphragm has a groove 84 around it with a portion of the outer wall 85 removed as at 86 where it is located adjacent to the outlet 42. A small bleed or weep hole 90 is provided through the inner wall 88 of the groove 84 to open into the groove. The hole 90, or several such holes, can be so provided through the inner wall 88, but for convenience in drilling it is located at the opening 86.

The cover 100 closely follows the exterior surfaces of the regulator except where it is well spaced therefrom at its periphery as shown in FIG. 3 to provide a protective, radially extensive, annular space 102 marginally around the joint 57 in communication with the vent opening 86. The cover is made of a soft resilient vinyl plastic, approximately three thirty-seconds inch thick and is slightly concave at its central portion 104 to contact the bonnet over the main portion thereof. An aperture at 106 is centrally provided which stretches and flexes to receive the bonnet boss 76 therethrough in a tight grip, preferably with a sharp edge contact as shown in FIG. 3.

The central portion 104 of the cover marginally extends beyond and arches away from and around the marginal edge of the bonnet in a circular wall 108 spaced at least half its width from the bonnet joint 57 to provide the annular space 102. Marginally the cover is reversed and flexed as at 110 to marginally terminate in a beaded edge 110 which draws firmly against the back face of the regulator body. The edge 110 is notched at 114 to accommodate the inlet and outlet ends of the body enlargement 48 with flexure contact against them.

Adjacent one of the notches 114 holes 118 are provided in the circular wall 108 spaced approximately the width of the outlet end of the enlargement 48 and indicia 120 are heat stamped or etched near the holes 118 to indicate that such is oriented downwardly on the regulator when applied.

As noted in FIGS. 4 and 5, the bonnet and body are recessed on their outer surfaces at six locations 122 and 124, respectively, to accommodate the heads and ends of the bonnet clamp bolts 60 so that they stay within the general contour defined by the bonnet and body walls. The recesses 122 on the bonnet are completely covered by the cover while the recesses 124 on the body may be only partially covered. Accordingly, the recesses 124 supplement the openings 118 for communication between the atmosphere and the circular chamber 102. The edge of the lower notch 114 also arches downwardly away from the end of the enlargement as at 126 (FIG. 4), particularly where it may contact the outlet service conduit 44, so that any water collecting in the annular chamber 102 in quantities more than the holes 118 can drain away at any moment will drain out at the notch. Both the notch and holes are located below the lowest extremity of the vent opening 86 as viewed in FIG. 3 and well below the reduced vent passage 90.

Thus, even when the trailer is being washed and water may find its way to the annular channel, such is drained within seconds. Otherwise the cover facing the towing vehicle protects the regulator against road splash, hard driving rain and rapid heat exchange, while the wall of the trailer assists in protecting against rain or sleet from that direction. The dangers occurring with the obstruction of the bonnet vent are thus removed by maintaining the vent free of obstruction and open to the atmosphere at all times.

In some respects the problem and improved results may not be fully understood. Therefore any attempt to analyze the theory which is believed to be involved is to be construed not as defining a determined problem and its solution, but merely as a possible explanation of certain physical phenomena which have been observed and controlled, and, although a certain preferred embodiment of the present invention has been shown and described herein, it will be apparent to those skilled in the art that various modifications, and changes may be made therein, without departing from the spirit and substance of the invention for maintaining a substantially constant and safe service gas pressure for burners that are in domestic use.

What is claimed is:

1. In a portable domestic liquefied propane gas system having a single stage pressure reduction regulator exposed to the weather including,
    a body enclosing a gas flow control valve,
    a spring bonnet having a flared skirt portion marginally secured to the body at a joint,
    diaphragm means between said body and bonnet controlling said valve and carrying a pressure relief valve responsive to and venting to the bonnet gas under pressure supplied by said controlled valve,
    open means at said joint for venting said bonnet to atmosphere, and
    cover means of flexible low heat conductive, resilient material having a central portion following the external contour of said skirt in contact therewith,
    a marginal portion contacting the back surface of the body, and
    an intermediate portion spaced a substantial distance from said joint to define a circular compartment around said joint open to the atmosphere in a plurality of locations including at least one below the level of said open vent means.

2. The combination called for in claim 1 in which said bonnet includes a central spring housing boss having an access opening for adjusting spring tension on the diaphragm closed by a removable plug means, and
    said cover having a stretchable opening centrally thereof receiving said boss in sealed relationship exposing only said boss to atmosphere.

3. The combination called for in claim 1 in which said joint includes the marginal edge of the diaphragm in sealed clamped relationship between the bonnet and body, said bonnet edge engaging said diaphragm having a channel therearound the outer wall of which has an aperture therethrough in communication with said circular chamber, and the inner wall of which has a bleed passageway therethrough interconnecting the channel and the interior of the bonnet.

4. The combination called for in claim 1 in which said contacting relationship includes gradual divergence of walls providing a capillary relation between the walls marginally along the circular compartment forming a path of flow of water in said compartment out of contact with said joint.

5. The combination called for in claim 1 in which said system and regulator is mounted on the tow bar of a trailer with said bonnet facing forward from the trailer and said open vent means is exposed at the lowest part of said joint.

6. In a portable domestic propane gas dispensing system,
    a single stage pressure reduction regulator exposed to weather and having a body, a bonnet and a bonnet vent at the margin of the bonnet, the combination therewith of,
    a weather protector received on the regulator bonnet comprising a formed flexible, low heat conductive, plastic member having a central opening to expose the regulator spring adjustment closure for servicing,
    a concave wall surrounding said opening to contact the regulator body beyond which it defines an axial wall portion and a reversely formed marginal radially extending snap wall engaging the back side of the regulator body to form in conjunction therewith a radially deep channel around the joint between the edges of the regulator bonnet and body, said axial wall portion having at least one drain hole therethrough for positioning at the lowest extremity of the regulator.

7. The combination called for in claim 6 in which said snap wall is notched to receive the inlet and outlet bosses of the regulator to free the remainder of the snap wall for ready flexure of the snap wall over the edge of the regulator for attachment thereto.

* * * * *